3,051,683
POLYTETRAFLUOROETHYLENE - HEXAFLUORO-
PROPYLENE-TETRAFLUOROETHYLENE COPOLYMER COLLOIDAL BLEND AND ARTICLE
THEREOF
Robert Salim Mallouk, Wilmington, Del., assignor to E. I. du Pont de Nemours and Company, Wilmington, Del., a corporation of Delaware
No Drawing. Filed Nov. 10, 1959, Ser. No. 851,973
5 Claims. (Cl. 260—45.5)

The process of the present invention relates to improved fluorocarbon resins, and, more particularly, to fluorocarbon resin blends.

Fluorocarbon resins, comprising substantially completely fluorinated addition polymers, such as polytetrafluoroethylene, are plastic materials which possess outstanding corrosion-resistance, thermal stability and dielectric properties. Although polytetrafluoroethylene possesses these outstanding properties when properly fabricated, the optimum properties of polytetrafluoroethylene are frequently not attained in view of the special techniques and critical conditions necessary for the fabrication of polytetrafluoroethylene. Thus, contrary to other thermoplastic resins, polytetrafluoroethylene is generally fabricated by a preforming technique followed by a free-sintering technique. The impermeability and electric insulating properties of a sintered polytetrafluoroethylene article depend to a significant extent on the degree of fusion of the polytetrafluoroethylene particles to themselves in the preformed article when the article is subjected to the sintering operation. The better the fusion, the less voids are found in the article, and the better are the resulting properties of the article. It would be highly desirable to formulate polytetrafluoroethylene compositions which are not as sensitive to sintering procedure where realization of the optimum properties of the resin is of significance.

It is, therefore, one of the objects of the present invention to provide modified polytetrafluoroethylene compositions having improved sintering properties. It is another object of the present invention to provide improved polytetrafluoroethylene compositions through blending with other fluorocarbon resins. Other objects will become apparent hereinafter.

In accordance with the present invention, it was discovered that polytetrafluoroethylene compositions combined with a tetrafluoroethylene-hexafluoropropylene copolymer in a concentration of 1 to 35% by weight of the total composition wherein the blend has an overall hexafluoropropylene concentration of 0.5 to 8%, have improved sintering properties which are superior to the sintering properties of polytetrafluoroethylene.

In accordance with the present invention, it was discovered that blends of hexafluoropropylene-tetrafluoroethylene copolymer and polytetrafluoroethylene have improved sintering characteristics as compared to the unmodified polytetrafluoroethylene. Thus, the novel composition of the present invention sinters to a more dense and uniform structure than is normally obtained with polytetrafluoroethylene and thereby causes an improvement in tensile properties, impermeability and electrical insulating properties in comparison to polytetrafluoroethylene. At the same time, however, the rheological properties of the blend remain substantially unchanged from those of polytetrafluoroethylene so that the free-sintering technique developed for polytetrafluoroethylene can be employed without causing any deformation during the sintering step. The fact that the melt viscosity of the blend remains unchanged, is greatly surprising in view of the fact that the copolymer has a substantially lower melt viscosity and indicates that the improvement in sintering is not the result of a lowered melt viscosity or the result of plasticization. However, if the copolymer content of the blend is substantially increased above 35%, the lower melt viscosity of the copolymer substantially decreases the melt viscosity of the blends which prevents the use of the blends in the free sintering technique developed for polytetrafluoroethylene. For that reason, compositions containing more than 35% of the copolymer are generally not employed. Furthermore, no significant improvement in the tensile properties of the blend over those of polytetrafluoroethylene is noted when the copolymer content of the blend is increased beyond the 35% concentration.

The improvement in properties is obtained when polytetrafluoroethylene and the copolymer are homogeneously admixed with each other. This is generally accomplished by admixing aqueous suspensions, commonly referred to as "dispersions," of the polymer and the copolymer, coagulating the resulting codispersion, and separating the aqueous medium from the blend. The polymerization of fluorocarbon monomers in an aqueous medium to form aqueous polymer dispersions is well established in the art and requires no further description. A particularly preferred method of preparing aqueous dispersions of copolymers of tetrafluoroethylene and hexafluoropropylene is described in U.S. Patent 2,946,763, issued July 26, 1961, to M. I. Bro and B. W. Sandt. Polymers and copolymers employed in the present invention are prepared by these established techniques.

The tetrafluoroethylene-hexafluoropropylene copolymers which give rise to the improvement in sintering properties in blends with polytetrafluoroethylene are characterized by the hexafluoropropylene content and by the molecular weight of the copolymer. The hexafluoropropylene content of the copolymer is measured by the specific I.R. ratio, which is defined as the net absorbance in the infrared spectrum at a wave length of 10.18 microns divided by the net absorbance at a wave length of 4.25 microns, as measured on a film about 2 mil thick obtained by melting, pressing and water-quenching a sample of the resin. Resins useful in forming the blends of the present invention have specific I.R. ratios varying from 1.5 to 6, corresponding to 6.5 to 27 weight percent of hexafluoropropylene in the resin.

The molecular weight of the copolymers suitable in forming blends with polytetrafluoroethylene which have improved sintering properties is measured by specific melt viscosity, by which is meant the apparent melt viscosity as measured at 380° C. under a shear stress of 6.5. p.s.i. The values herein referred to are determined using a melt indexer of the type described in ASTM test D–1238–52 T modified for corrosion resistance by employing a cylinder, a piston, and an orifice made of "Stellite" cobalt-chromium-tungsten alloy. The resin is charged to the 0.375 in. I.D. cylinder which is held at 380° C.±0.5° C. allowed to come to an equilibrium temperature during five minutes, and extruded through the 0.0825 in. diameter, 0.315 in. long orifice under a piston loading of 5000 g. The specific melt viscosity is calculated as 53,150 divided by the observed extrusion rate in g./min. The specific melt viscosity of tetrafluoroethylene-hexafluoropropylene copolymers suitable for purposes of the present invention varies from $1.5 \times 10^3$ to $3 \times 10^5$ poises.

Subsequent to the blending of the two polymers, various after-treatments may be employed without detracting from the improvement resulting from the blending. Thus, volatile components, contained in the copolymer and transferred to the blend, may be removed by heat treatment. The polymer molecules in the blend may be stabilized through end-capping by treatment with water to form —$CF_2H$ end-groups or stabilizers of various nature may be added, if desired.

The improvement in sinterability of the polymer blends of the present invention is determined by placing spherical or cylindrical forms of the composition adjacent to each other and measuring the ratio of the junction line ($x$) at the point of contact to the diameter ($a$) of the sphere or cylinder, on exposure of the forms to sintering conditions. This technique has been developed to study the sinterability of glass (see G. C. Kuczynski, J. Applied Physics, Vol. 20, 1160–3, 1949) and metals (see G. C. Kuczynski, J. Metals 1, 169–98, 1949).

The invention is further illustrated by the following examples.

EXAMPLE I

Aqueous dispersions of polytetrafluoroethylene containing 34.6% of polytetrafluoroethylene, based on the liquid medium were admixed with aqueous dispersions of a hexafluoropropylene-tetrafluoroethylene copolymer containing 16.0% of the copolymer in such proportions as to give rise to the blends listed below. The copolymer employed contained 14.9% of hexafluoropropylene and had a specific melt viscosity of $5.61 \times 10^4$ poises. The resulting co-dispersions were coagulated using the method described in U.S. Patent 2,593,583, issued to J. F. Lontz on April 22, 1952. The coagulated blends were dried and then intimately admixed with 19% by volume of "VM&P" Naphtha, a commercially available hydrocarbon lubricant comprising a mixture of petroleum hydrocarbons boiling between 93 and 162° C. The resulting lubricated blends were ram-extruded at room temperature through an orifice 0.060 in. in diameter under a pressure of 3200 to 3600 p.s.i., utilizing the technique described in U.S. Patent 2,685,707, issued August 10, 1954, to W. E. Llewyllyn and J. F. Lontz. The resulting beading was arranged in bundles of seven members forming a hexagonal array, the seventh member acting as an inner core, and given a twist of one turn in approximate one in. length. The cabled construction was then made secure at the ends of approximately two inch length, placed in a fixture to prevent unravelling and then sintered for two hours at the temperature indicated below.

The resulting cabled construction was microtomed transversely to give sections on which measurements of the ratio of the sintering junction line ($x$) to the diameter of the cable member ($a$) were made. The apparent melt viscosity of the unmodified polytetrafluoroethylene and the blends was determined at 380° C. from melt creep measurements. The table summarizes the results obtained.

Table I

| Blend Composition | | Sintering Temperature in °C. | Apparent Melt Viscosity in Poises | $x/a$ | Percent Improvement in $x/a$ |
|---|---|---|---|---|---|
| Polytetrafluoroethylene | Copolymer | | | | |
| 100 | ---- | 380 | $4.5 \times 10^{10}$ | 0.1778 | ---- |
| 90 | 10 | 380 | $10.33 \times 10^{10}$ | 0.2448 | 37.7 |
| 80 | 20 | 380 | $7.37 \times 10^{10}$ | 0.2540 | 43.4 |
| 100 | ---- | 420 | $4.59 \times 10^{10}$ | 0.2113 | ---- |
| 90 | 10 | 420 | $10.33 \times 10^{10}$ | 0.2590 | 17.8 |
| 80 | 20 | 420 | $7.37 \times 10^{10}$ | 0.2748 | 30.1 |

EXAMPLE II

Aqueous dispersions of polytetrafluoroethylene containing 35% of colloidally dispersed polytetrafluoroethylene were admixed with aqueous dispersions of tetrafluoroethylene-hexafluoropropylene copolymer containing 16% of colloidally dispersed copolymer in proportions to give rise to the ratios of polymer and copolymer stated in Table II. The polytetrafluoroethylene employed was of the high molecular weight, commercially available type; the copolymer employed had an I.R. ratio of 3.74, corresponding to 17% hexafluoropropylene in the copolymer and a specific melt viscosity of $4.8 \times 10^4$ poises. The mixtures were gently agitated until homogenous mixtures were obtained and then subjected to violent agitation in a Waring Blendor until coagulation of the blended polymeric material occurred. The coagulated blends were washed with water and treated with an aqueous solution of potassium sulfate in sufficient concentration to incorporate 300 p.p.m. of the salt. The salt was employed as a melt stabilizer for the copolymer portion of the blends. The blends were dried for 16 hours at 150° C. Compositions containing more than 50% of polytetrafluoroethylene were preformed into 60 to 80 mil sheets at 2000 p.s.i., free-sintered in an oven for two hours at 380° C. and cooled at 2° C./min. Compositions containing more than 50% of the copolymer were heated at 360° to 380° C. in an air oven for two hours to remove any volatiles in the blend, then compression molded at 340° C./min. The tensile strength of the molded sheets was measured at a crosshead speed of 2 inches per minute using microtensile specimens as set forth in ASTMD–1457–56. The same procedure was employed for the preparation of samples from, and the measurement of, tensile strength of unmodified polytetrafluoroethylene and hexafluoropropylene-tetrafluoroethylene copolymer.

Table II

| Blend No. | 1 | 2 | 3 | 4 | 5 | 6 |
|---|---|---|---|---|---|---|
| Percent of polytetrafluoroethylene | 0 | 10 | 35 | 65 | 90 | 100 |
| Percent of tetrafluoroethylene-hexafluoropropylene copolymer | 100 | 90 | 65 | 35 | 10 | 0 |
| Measured hexafluoropropylene concentration in blend measured by I.R. ratio (percent) | 17 | 14 | 9 | 6 | 1.6 | 0 |
| Tensile strength at 23° C. in p.s.i. | 2,430 | 2,100 | 2,010 | 3,030 | 2,950 | 2,340 |

Although, as can be seen from Table II, the tensile strengths of polytetrafluoroethylene and of the copolymer are only slightly different, a substantial improvement in tensile strength is observed in the blends of polytetrafluoroethylene containing up to 35% of the copolymer. Furthermore, as can be seen from Table I, a substantial improvement in sinterability as measured by the increase of the junction line between the beads of the cable is also obtained through blending with the copolymer. The addition of the tetrafluoroethylene-hexafluoropropylene copolymer had little, if any, effect on the apparent melt viscosity of the polytetrafluoroethylene, thus indicating that the improvement obtained was not the result of a rheological phenomenon, which could have been expected from the presence of the lower melt viscosity of the copolymer.

The novel compositions of the present invention, as a result of their improved sinterability, provide improved mechanical and electrical properties, and, furthermore, permit the fabrication of polytetrafluoroethylene to articles having optimum properties over a wider range of conditions.

The improvement in the sinterability of the polytetrafluoroethylene, tetrafluoroethylene-hexafluoropropylene copolymer blends is not limited to any particular copolymer, but is generally obtained in all copolymers having the hexafluoropropylene content and the specific melt viscosity mentioned above. Thus, similar results are obtained with copolymers containing 5, 10, 20 and 25% of hexafluoropropylene in the copolymer. Since the copolymer can be varied in the blend, both as to quantity of the copolymer added and in the hexafluoropropylene concentration of the copolymer, it is preferred to maintain the overall concentration of hexafluoropropylene in the blend between 0.5 and 8%.

Blends of the polytetrafluoroethylene and the copolymer of tetrafluoroethylene and hexafluoropropylene are also useful in the form of aqueous dispersions as obtained by admixing aqueous dispersions of the components, described hereinabove. Such co-dispersions have been found to give rise to improved casting compositions in that thicker films can be cast from the co-dispersion than from either polymer dispersion alone without obtaining cracks in the cast film on sintering.

The compositions of the present invention are useful in all applications employing unmodified polytetrafluoroethylene and are of particular use in such applications as require impermeability and good electrical insulating properties.

Thus, the blends in powder form can be employed in the molding of solid shapes, they can be employed in paste extrusion to produce sheets, films, pipes, rods, coatings on wire, etc. In their dispersion form, the blends of the present invention can be employed to impregnate and coat woven and non-woven fabrics, and in the spinning of fibers.

The term "polytetrafluoroethylene" as used herein defines a high molecular weight, solid polymer of tetrafluoroethylene, such as described and claimed in U.S. Patent 2,230,654, issued February 4, 1941, to R. F. Plunkett.

I claim:

1. A composition of matter comprising a homogeneous colloidal blend of 65 to 99 weight percent of colloidal polytetrafluoroethylene and complementally therewith 35 to 1 weight percent of a colloidal copolymer of hexafluoropropylene and tetrafluoroethylene, said copolymer having a hexafluoropropylene content of 6.5 to 27 weight percent and a specific melt viscosity of $1.5 \times 10^3$ to $3 \times 10^5$ poises, said homogeneous blend having a hexafluoropropylene content of from 0.5 to 8%.

2. The composition of claim 1 wherein the tetrafluoroethylene-hexafluoropropylene copolymer contains from 12 to 17 weight percent of hexafluoropropylene.

3. The composition of claim 2 wherein the copolymer is employed in a concentration of 10 to 20 weight percent.

4. The product of claim 1 in the form of film.

5. The product of claim 1 in the form of fiber.

References Cited in the file of this patent

UNITED STATES PATENTS

| | | |
|---|---|---|
| 2,468,664 | Hanford et al. | Apr. 26, 1949 |
| 2,549,935 | Sauer | Apr. 24, 1951 |
| 2,681,324 | Hochberg | June 15, 1954 |
| 2,719,833 | Vincent et al. | Oct. 4, 1955 |
| 2,824,060 | White | Feb. 18, 1958 |
| 2,946,763 | Bro et al. | July 26, 1960 |